US011301748B2

(12) United States Patent
Sha et al.

(10) Patent No.: US 11,301,748 B2
(45) Date of Patent: Apr. 12, 2022

(54) AUTOMATIC FEATURE EXTRACTION FROM AERIAL IMAGES FOR TEST PATTERN SAMPLING AND PATTERN COVERAGE INSPECTION FOR LITHOGRAPHY

(71) Applicant: INTERNATIONAL BUSINESS MACHINES CORPORATION, Armonk, NY (US)

(72) Inventors: Jing Sha, White Plains, NY (US); Martin Burkhardt, White Plains, NY (US); Sean Burns, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

(21) Appl. No.: 16/188,803

(22) Filed: Nov. 13, 2018

(65) Prior Publication Data

US 2020/0151538 A1 May 14, 2020

(51) Int. Cl.
*G06T 7/11* (2017.01)
*G06N 3/04* (2006.01)
*G06N 3/08* (2006.01)
*G06T 7/00* (2017.01)
*G06T 7/174* (2017.01)
(Continued)

(52) U.S. Cl.
CPC .............. *G06N 3/04* (2013.01); *G06N 3/08* (2013.01); *G06T 7/0004* (2013.01); *G06T 7/11* (2017.01); *G06T 7/174* (2017.01); *G06V 20/176* (2022.01); *G06K 9/6218* (2013.01); *G06T 2207/20081* (2013.01); *G06T 2207/20084* (2013.01); *G06T 2207/30148* (2013.01)

(58) Field of Classification Search
CPC .......... G06N 3/04; G06N 3/08; G06T 7/0004; G06T 7/174; G06T 7/11; G06T 2207/20084; G06T 2207/20081; G06T 2207/30148; G06K 9/00637; G06K 9/6218
USPC ........................................................ 382/159
See application file for complete search history.

(56) References Cited

U.S. PATENT DOCUMENTS

| 4,628,531 | A | * | 12/1986 | Okamoto | G01N 21/956 356/237.5 |
| 6,122,397 | A | * | 9/2000 | Lee | G06T 7/001 382/141 |
| 10,032,281 | B1 | | 7/2018 | Ghesu et al. | |

(Continued)

*Primary Examiner* — Amandeep Saini
(74) *Attorney, Agent, or Firm* — Cantor Colburn LLP; Abdy Raissinia

(57) ABSTRACT

According to one or more embodiments of the present invention a computer-implemented method for fabricating a chip includes generating, using an aerial image generation system, a set of aerial images for a chip layout, the set of aerial images including an aerial image corresponding to each region from the chip layout. The method further includes automatically determining, using an artificial neural network, a feature vector for each aerial image from the set of aerial images. The method further includes clustering the aerial images using their corresponding feature vectors. The method further includes selecting, as test samples, a predetermined number of aerial images from each cluster. The method further includes performing a pattern coverage inspection of the chip layout using the aerial images that are selected as test samples.

20 Claims, 9 Drawing Sheets

(51) Int. Cl.
*G06V 20/10* (2022.01)
*G06K 9/62* (2022.01)

(56) References Cited

U.S. PATENT DOCUMENTS

| | | | |
|---|---|---|---|
| 2003/0219154 A1* | 11/2003 | Medvedeva | G03F 7/70666 382/144 |
| 2007/0097470 A1* | 5/2007 | Schneider | G02B 1/005 359/10 |
| 2014/0341462 A1* | 11/2014 | Sezginer | G01N 21/95607 382/149 |
| 2014/0358830 A1* | 12/2014 | Chiang | G06N 20/00 706/12 |
| 2017/0076438 A1* | 3/2017 | Kottenstette | G06K 9/627 |
| 2017/0116387 A1 | 4/2017 | El-Zehiry | |
| 2017/0372222 A1 | 12/2017 | Kollia et al. | |
| 2018/0018391 A1 | 1/2018 | Kaji | |
| 2018/0061058 A1 | 3/2018 | Xu et al. | |
| 2018/0061059 A1 | 3/2018 | Xu et al. | |
| 2018/0372493 A1* | 12/2018 | Pilkington | G01C 11/04 |
| 2019/0012599 A1* | 1/2019 | el Kaliouby | G06N 3/084 |
| 2019/0080456 A1* | 3/2019 | Song | G06T 7/11 |
| 2019/0130641 A1* | 5/2019 | Barajas Hernandez | G06T 17/20 |

* cited by examiner

AUTOMATIC FEATURE EXTRACTION FROM AERIAL IMAGES FOR TEST PATTERN SAMPLING AND PATTERN COVERAGE INSPECTION FOR LITHOGRAPHY

BACKGROUND

Embodiments of the present invention are directed to integrated circuit manufacturing. More particularly, embodiments of the present invention are directed to automatic feature extraction from aerial images for test pattern sampling and pattern coverage inspection.

Lithography is utilized for the fabrication of semiconductor structures, such as integrated circuits and micromechanical structures. The basic process of producing a semiconductor structure involves the modification of the surface material of a semiconductor substrate, such as of silicon, in a pattern. The interplay of the material changes and the pattern defines the electrical characteristics of the microelectronic device. A similar process can be used to form micromechanical devices, by, for example, electroplating metal structures in a desired pattern onto a substrate. Lithography is used to define the pattern on the substrate, which will be doped, etched, or otherwise modified to form the microelectrical or micromechanical device.

In a basic lithography process for the fabrication of semiconductor structures, a photoresist is deposited on a substrate surface. The photoresist is sensitive to radiation, e.g., extreme ultraviolet (EUV) radiation, and, depending on the photoresist used, portions of the photoresist that are exposed to the radiation can be removed (or left remaining) by a development process. The semiconductor structure is formed by etching or otherwise modifying the substrate in the areas from which the photoresist has been removed. To form a desired pattern in the photoresist, the radiation that is used to expose the photoresist is passed through or reflected off of a lithography mask that defines the pattern that is to be transferred to the photoresist.

SUMMARY

According to one or more embodiments of the present invention a computer-implemented method for fabricating a chip includes generating, using an aerial image generation system, a set of aerial images for a chip layout, the set of aerial images including an aerial image corresponding to each region from the chip layout. The method further includes automatically determining, using an artificial neural network, a feature vector for each aerial image from the set of aerial images. The method further includes clustering the aerial images using their corresponding feature vectors. The method further includes selecting, as test samples, a predetermined number of aerial images from each cluster. The method further includes performing a pattern coverage inspection of the chip layout using the aerial images that are selected as test samples.

According to one or more embodiments of the present invention, a system for fabricating a chip includes a memory, and a processor coupled with the memory. The processor performs a method for fabricating a chip includes generating, using an aerial image generation system, a set of aerial images for a chip layout, the set of aerial images including an aerial image corresponding to each region from the chip layout. The method further includes automatically determining, using an artificial neural network, a feature vector for each aerial image from the set of aerial images. The method further includes clustering the aerial images using their corresponding feature vectors. The method further includes selecting, as test samples, a predetermined number of aerial images from each cluster. The method further includes performing a pattern coverage inspection of the chip layout using the aerial images that are selected as test samples.

According to one or more embodiments of the present invention a computer program product including a computer readable storage medium has program instructions embodied therewith, the program instructions executable by a processing circuit to perform a method for adjusting design of a chip. The method includes generating, using an aerial image generation system, a set of aerial images for a chip layout, the set of aerial images including an aerial image corresponding to each region from the chip layout. The method further includes automatically determining, using an artificial neural network, a feature vector for each aerial image from the set of aerial images. The method further includes clustering the aerial images using their corresponding feature vectors. The method further includes selecting, as test samples, a predetermined number of aerial images from each cluster. The method further includes performing a pattern coverage inspection of the chip layout using the aerial images that are selected as test samples.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
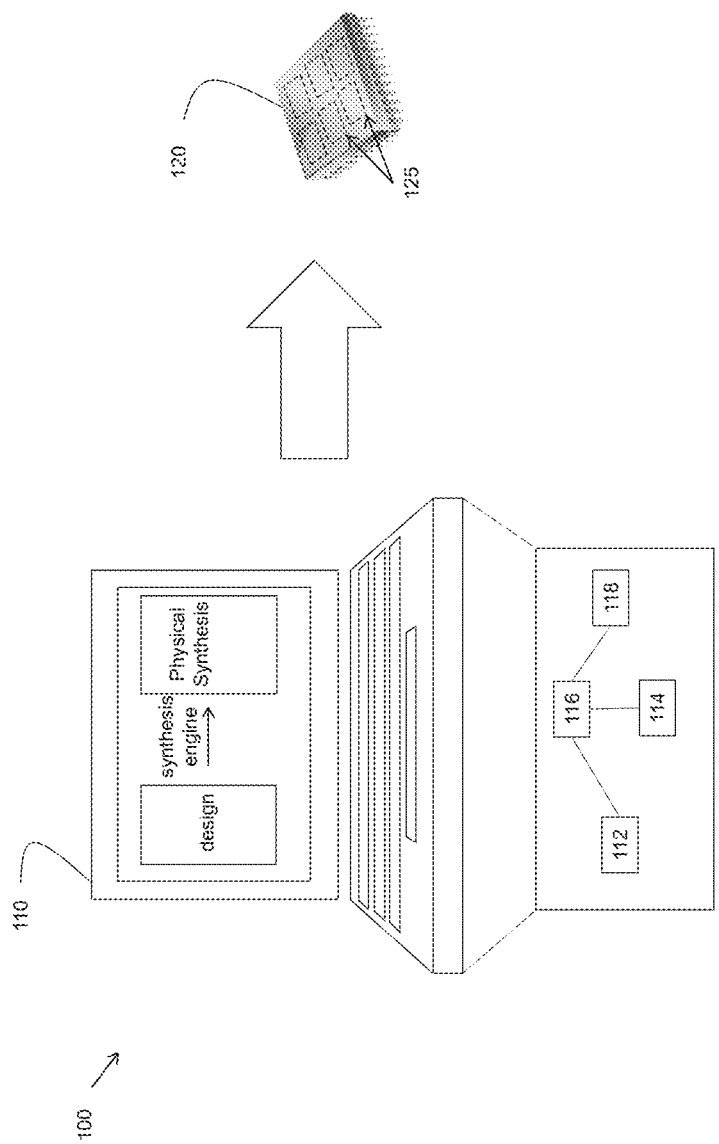
FIG. 1 depicts a physical synthesis system used to synthesize a physical design such as a semiconductor chip according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Existing solutions for performing test pattern sampling and pattern coverage inspection include using software tools such as electronic design automation (EDA) software tools. In such cases, the software tools can be used to visualize simulated aerial images of an electronic circuit that is to be "printed" on a chip. Alternatively, or in addition, aerial image parameters of the electronic circuit can be categorized using predetermined features to be inspected from the aerial images. In one or more examples, manual selection of image parameters for the aerial images are provided for analyzing the pattern coverage. In one or more examples, such aerial image parameters are limited to one-dimensional (1D) cutlines. As can be understood by a person skilled in the art, such existing solutions operate using engineering judgment, where a user provides particular features to inspect in aerial images.

Further, reliability of such inspection techniques can be low because of the reliance on engineering judgment for performing such inspection. Further yet, such pattern inspection is limited to 1D cutlines and do not take advantage of 2D contour measurement by metrology.

Described herein are technical solutions for test pattern sampling and pattern coverage inspection, which are used for semiconductor manufacturing, particularly using photolithography. Reducing the number of test patterns to sample to ensure pattern coverage while keeping modeling accuracy can reduce metrology turnaround time after photolithography. One or more embodiments of the present invention address technical challenges regarding test pattern sampling and pattern coverage inspection and provide pattern coverage inspection that improves categorization, clustering, and number of sample test patterns to be used. As such the technical solutions are rooted in and/or tied to computer technology in order to overcome a problem specifically arising in the realm of computers, specifically manufacturing semiconductors, such as integrated chips.

With reference now to FIG. 1, a physical synthesis system 100 configured to synthesize a physical design such as a semiconductor chip, for example, is illustrated according to a non-limiting embodiment of the invention. The physical synthesis system 100 includes a processing system 110 (e.g., computer) that implements one or more computer processors such as, for example, an electronic hardware synthesis controller 116 that controls one or more synthesis modules or engine. An input interface 112 (e.g., keyboard, mouse) can be used to develop the logic design which is stored in one or more memory devices 114 of the processing system 110. An output interface 118 (e.g., display, output port) displays a graphical layout or design resulting from the synthesis and/or provides information to place and route components of the physical implementation 120 (e.g., chip). The information includes, but is not limited to, the latch placement location, gate placement location, critical paths, critical gates on the critical path, anchor points, component locations with respect to one or more critical paths, and potential free-space locations, highlighted or emphasized ideal free-space location(s) with respect to a critical path(s) and existing components, and slack benefit values with respect to given free-space.

The physical implementation 120 includes creating components 125 (e.g., transistors, resistors, capacitors) and interconnections therebetween on a semiconductor (e.g., silicon wafer). The physical layout of circuit sub-blocks or physical regions affects the length of a connecting wire between components and, thus, the timing of signals between them, for example. The synthesis controller 116 can include one or more individual sub-modules or sub-controllers that execute a respective physical synthesis operation.

In one or more examples, optimization of the synthesis takes into account feedback based on an optimization that has been identified. The feedback can be automated, for example, by identifying and computing one or more metrics associated with one or more regions, critical points, or other elements of the chip design. Alternatively, or in addition, the feedback includes user feedback via the I/O interfaces 112/118.

A number of defects can be created during the manufacturing of a digital integrated circuit (IC) 120. These defects can affect the logic output of the digital IC 120, which in turn adversely influences semiconductor chip quality and costs. Industry has developed a number of testing techniques to test for the defects, such as pattern coverage inspection. A goal of testing is to improve test coverage, i.e. to test as many likely scenarios as possible. Test coverage can be improved by expanding the controllability of test areas on the digital IC 120.

In one or more examples, the synthesis controller 116 uses lithography, such as photolithography, for manufacturing the physical implementation, that is chip or semiconductor 120. The photo-lithography process 220 in semiconductor fabrication consists in duplicating desired mask shapes 210 as best as possible onto a semiconductor wafer 120. The mask shapes 210 can be different from the desired circuit patterns so that after photolithography desired circuit patterns can be fabricated on the substrate. The desired mask shapes 210 can be polygons/patterns on the photomask to take into account light interaction (diffraction) with photomasks. The desired circuit patterns (from design) are related to the mask shapes 210 (on photomasks) through a process of optical proximity correction (OPC).

Figure 2:
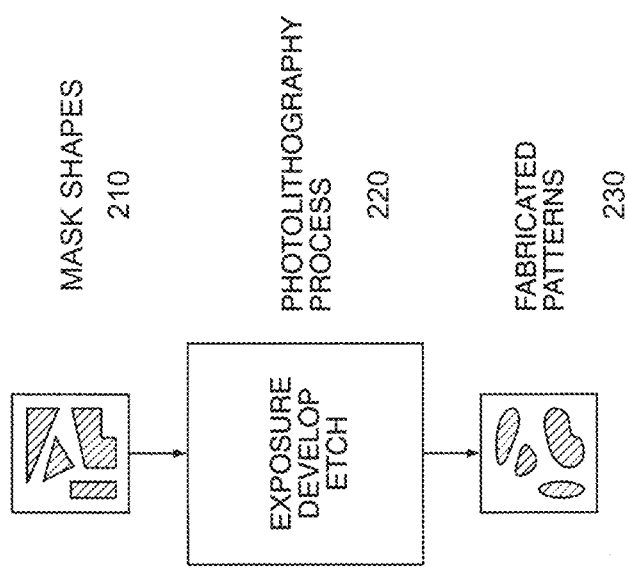
FIG. 2 shows a conventional break-up of the lithography process in three steps: exposure, develop and etch, the lithography process improved by one or more embodiments of the present invention.

This process, shown in FIG. 2, is conventionally subdivided into three steps: exposure, develop, and etch. The exposure step projects the desired circuit mask shapes 210 onto a film of photosensitive material commonly referred to as photoresist. The desired mask shapes 210 are typically represented as opaque (or translucent in some cases) and transparent regions on a template commonly called a photomask. Semiconductor circuits 125 are then repeatedly reproduced from this template by a variety of techniques, among them projection being the most popular for mass production of semiconductor circuits due to its high throughput and relative low cost. In optical photolithography, patterns on the photomask template are duplicated onto the photoresist coated wafers by way of optical imaging through an exposure system. The images of these patterns interact with chemicals in the photoresist, creating latent images. The latent images are, typically, variations in concentration of chemical species which must be developed and, if necessary, transferred onto the wafer. This transfer process is accomplished by the develop and etch steps. In the former, a developer is utilized to discriminately dissolve the photoresist, creating patterns on the photoresist from the latent images which resemble the desired mask shapes 210. This discrimination is made possible by the differentiation of dissolution rate due to variations in chemical concentration of the latent images. After developing the photoresist, the patterns 230 are etched, if necessary, onto the wafer 120 and the circuits 125 are fabricated.

Figure 3:
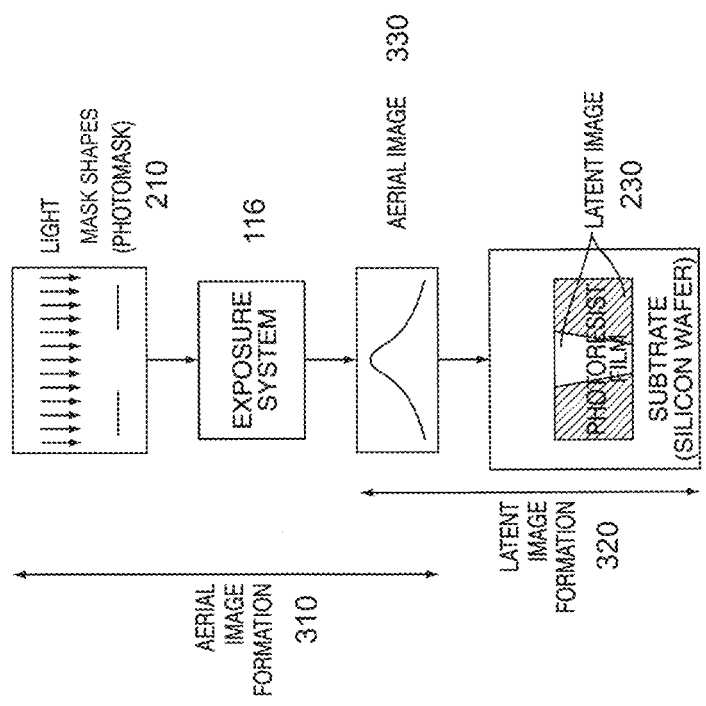
FIG. 3 shows a conventional break-up of the exposure step into two known steps: aerial image and latent image formation, the aerial images used by one or more embodiments of the present invention.

As shown in FIG. 3 and of relevance to the discussion to follow, the exposure step is typically divided into two sub-steps: an aerial image formation 310 and a latent image formation 320 previously described. The images that are formed by the exposure system of the photomask template before they interact with the photoresist are the aerial images 330. Because the template patterns typically have sharp transitions between opaque and clear regions (i.e., sharp corners), and keeping in mind that the exposure system can be viewed as a low pass (spatial frequency) filter, the aerial images 330 resemble but do not exactly replicate the photomask pattern.

Generating the aerial images 330 of a chip layout L includes dividing the pattern of the layout L into multiple regions R. Each region R includes geometric characteristic of one or more fragments of the circuit. Accordingly, for a single chip layout L, multiple aerial images 330 are generated, the set of aerial images 330 including an aerial image 330 for each region R from the layout L, respectively.

Aerial image simulators which compute the aerial images 330 generated by optical projection systems 110 are a valuable tool to improve the state-of-the art in optical lithography for integrated circuit applications. Such simulators have recently found wide-spread application in advanced mask designs, e.g., phase-shifting mask (PSM) design, optical proximity correction (OPC) in automated inspection of PSMs and OPC masks, and in the design of projection optics, e.g., pupil and illumination filters. One of the main challenges to using model-based simulators in integrated circuit (IC) mask applications is the formidable size of the data representing a typical IC pattern. To illustrate this point and considering a moderately sized IC occupying 10 mm×10 mm of silicon with a minimum feature size of 0.25 um, a sparse sample spacing of 25 nm along each side immediately results in $1.6 \times 10^{11}$ points to represent the image of the chip 120. Hence, it is extremely important in this application to minimize both the number of operations required to compute the image and the memory space needed.

Because of the limited resolution of the current photolithographic tools such as, steppers, the patterns defined on the photomask are transferred into the resist on the wafer with some distortions referred to as optical proximity effects. For example, consequences in terms of line width control are: corner rounding, difference between isolated and semi-isolated or dense patterns, lack of CD linearity or where small features print even smaller than their expected size compared to large features, and line end shortening where the length of a line having a small line width becomes smaller than its expected size.

Moreover, optical proximity effects are convoluted with subsequent processing step distortions like resist processing, dry etch proximity effects and wet etch proximity effects. In order to achieve a sufficient line width control at the wafer level, the physical design patterns are corrected for proximity effects, for example, re-entrant and outside serifs are used to correct rounding and the edges of the patterns are moved to correct line width errors. Another technique used includes adding small, non-printing features, referred to as subresolution features, in order to correct line width errors. In some cases, these features can also improve the process latitude of the printed resist patterns.

Accordingly, one or more embodiments of the present invention address the technical challenges described herein and the limitations of the existing technical solutions by using deep neural networks to automatically extract features from simulated aerial images for test pattern sampling and pattern coverage inspection. One or more embodiments of the present invention facilitate automatic extraction of features in simulated aerial images that are unique and representative. The extracted features are accordingly not subject to human judgment or limited to a predetermined set of features. Further, the extracted features according to one or more embodiments of the present invention can be derivatives of image parameters that represent test patterns using fewer number of testing samples. The one or more embodiments of the present invention further facilitate efficient data collection beyond just 1D cutlines that are presently used, rather supporting 2D contour measurement at metrology. Further yet, the neural network models that are used for the automatic feature extraction can be tuned on a case-by-case basis, increasing the dynamic feature extraction provided by one or more embodiments of the present invention. The trained neural network model can be applied to any future aerial images under the same exposure condition, regardless of size of the chip layout, thus increasing scalability of the technical solutions provided by one or more embodiments of the present invention.

Figure 4:
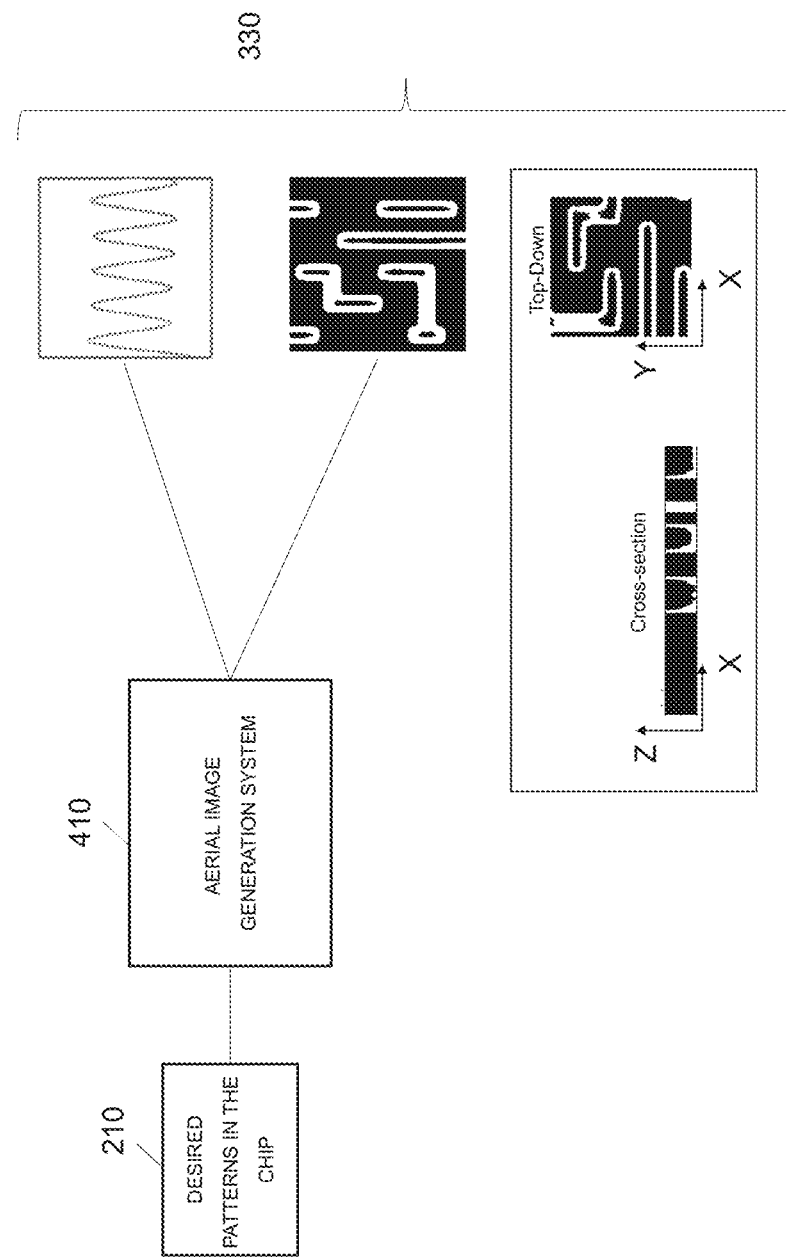
FIG. 4 depicts example aerial images used by one or more embodiments of the present invention.

FIG. 4 depicts example aerial images. In one or more examples, the aerial images 330 for the desired mask shapes 210 for the chip 120 can be obtained using an aerial image generation system 410 that emulates the lithography exposure conditions. The aerial image generation system 410 can generate the aerial images 330 either via experimental measurements, using aerial image measurement system (AIMS), or via simulation using EDA software. Experimental measurement using AIMS usually takes more time than simulation using EDA software. Also, EDA software simulation does not require a photomask as AIMS to generate aerial images, so it can be used for any physical design layouts for manufacturability assessment. Therefore, typically, software simulation is used more frequently for applications such as failure mode analysis or design technology co-optimization. However, it should be noted that any techniques for obtaining the aerial images 330 can be used.

The aerial image generation system 410 records the aerial images 330, or the image of the photomask that is projected onto the photoresist by the lithography exposure tool. The aerial images 330 can be regarded as the incident image that is imposed on the wafer. As depicted, an aerial image 330 generated can be a one-dimensional (1D) image that indicates the intensity of the light at different positions as a curve. Alternatively, or in addition, the aerial image 330 can be a two-dimensional (2D) image that indicates the intensity of the light as various contours obtained from measurements from metrology. Alternatively, or in addition, the aerial image 330 can be a three-dimensional (3D) image that indicates the intensity of the light at various planes in the chip 120. In one or more examples, the 3D aerial image includes multiple 2D images at different focus planes in the chip 120.

Projection imaging tools, such as scanners, steppers, or step-and-scan tools, project an image of a mask pattern into air or immersion fluid, and then ultimately into the photoresist. An aerial image 330 is the mask image projected onto the plane of the photoresist-coated wafer but assuming that only air or immersion fluid occupies this space rather than the phtotoresist-coated wafer. The aerial image 330 shows a distribution of light intensity as a function of spatial position within (or near) the image plane. The quality of the aerial image 330 dictates the quality and controllability of the final resist profile—the printed image 120. Accordingly, aerial image parameters can be used to predict printability of the design of the chip 120.

In various embodiments of the invention, features of the aerial image 330 can include any combinations of maximum, minimum intensities ($I_{max}$ and $I_{min}$), the aerial image contour curvature (curvature), the slope of the aerial image intensity profiles (slope) and other aerial image parameters.

Figure 5:
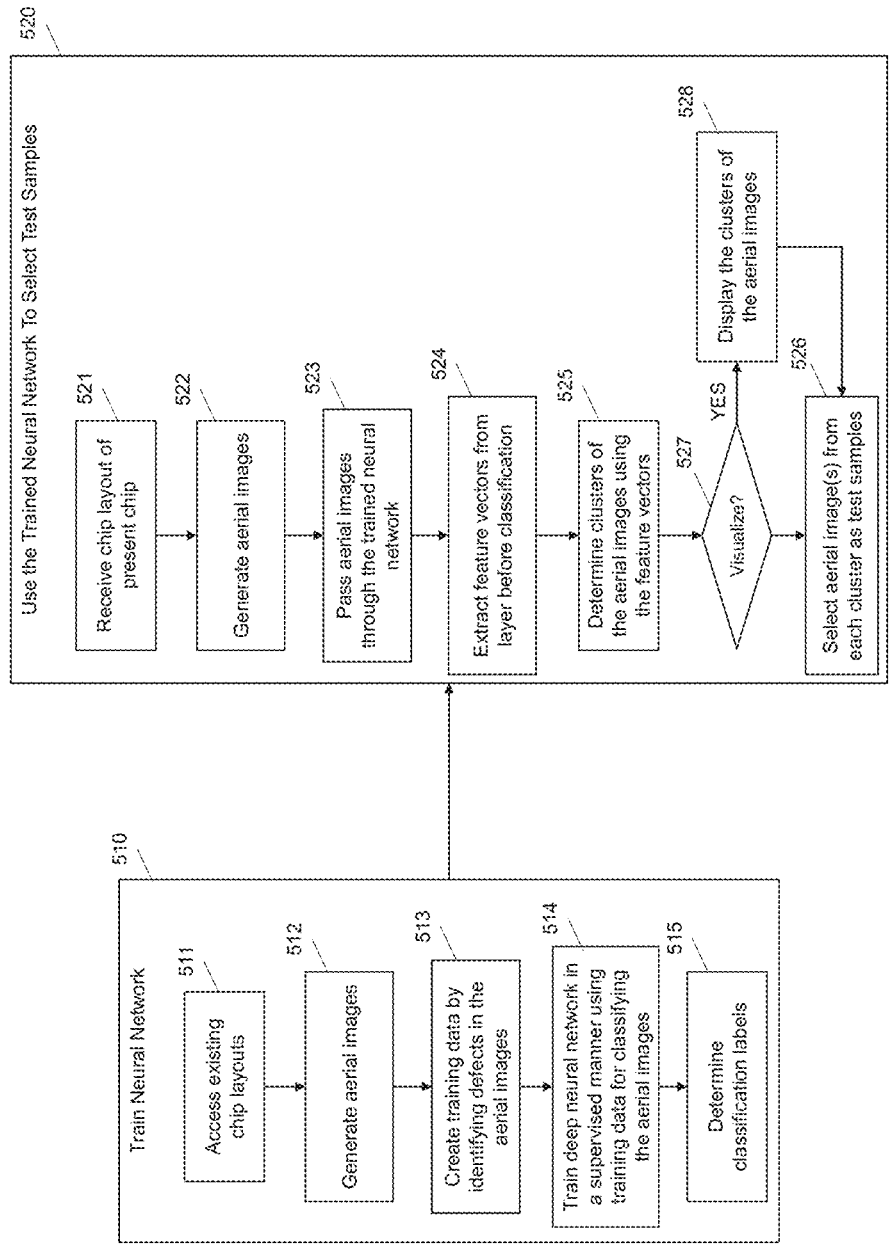
FIG. 5 illustrates a flowchart of a method of automatic feature extraction from aerial images for test pattern sampling and pattern coverage inspection according to one or more embodiments of the present invention.
Figure 6:
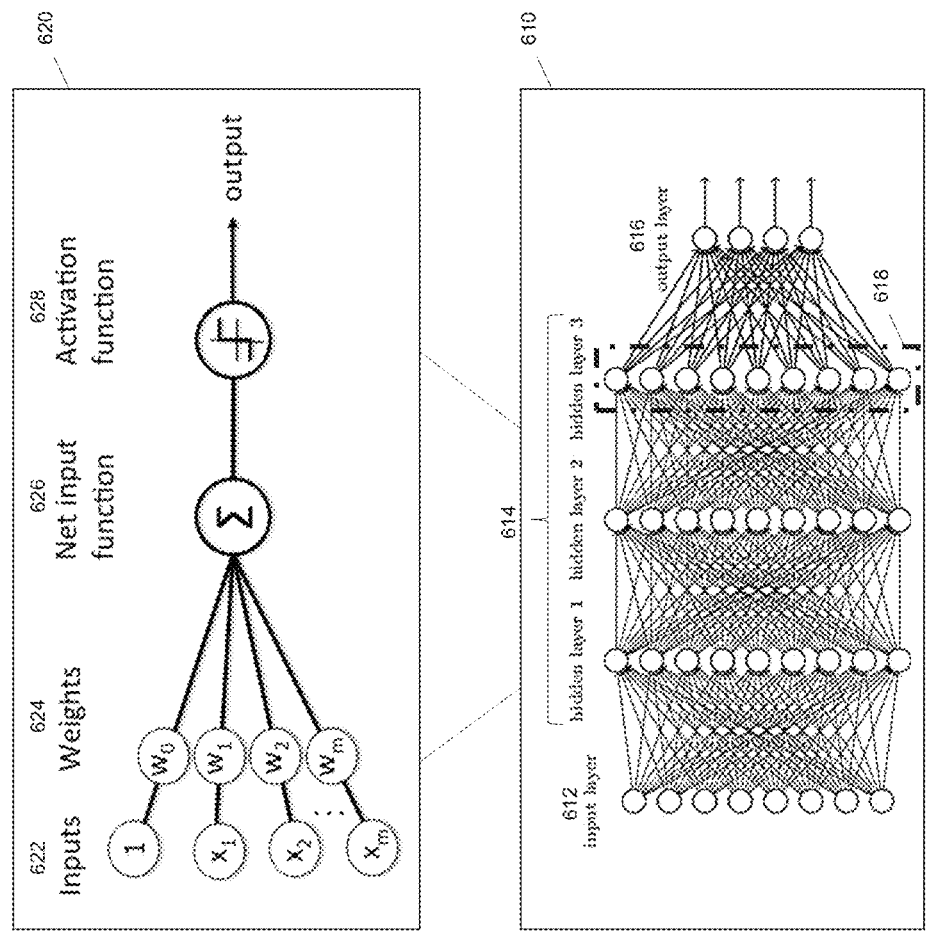
FIG. 6 depicts an example deep neural network (DNN) according to one or more embodiments of the present invention.

FIG. 5 illustrates a flowchart of a method of automatic feature extraction from aerial images for test pattern sampling and pattern coverage inspection according to one or more embodiments of the present invention. The method includes training an artificial neural network, such as a deep neural network (DNN) to classify the aerial images 330, at 510. The DNN can be implemented using any one or more techniques. FIG. 6 depicts an example DNN according to one or more embodiments of the present invention. The DNN 610 includes at least three types of layers, an input layer 612, a hidden layer 614, and an output layer 616. In general, a "DNN" includes more than three layers (including input and output) to qualify as performing "deep" learning, where "deep" is defined as more than one hidden layer 614. It is understood that in one or more embodiments of the present invention the DNN 610 can include a different number of layers than what is depicted in FIG. 6. It should be noted that one or more embodiments of the present invention can be implemented using convolutional neural networks (CNNs), autoencoder, fully connected neural network, and/or any other neural network architecture.

Each layer of the DNN 610 includes one or more neurons 620. A neuron 620 (also referred to as "node" in some cases) is a unit where computation of the DNN 610 happens, and is loosely patterned on a neuron in a human brain, which fires when it encounters sufficient stimuli. In general, a neuron 620 combines input 622 from the data with a set of coefficients, called "weights" 624. The weights 624 either amplify or dampen the input 622, thereby assigning significance to inputs for the task/feature that the algorithm is trying to learn. For example, the weights can represent which input 622 is more/less helpful in classifying the input data with least error. The resulting input-weight products can be summed (626) and the sum is passed through an activation function 628, to determine whether and to what extent that signal progresses further through the DNN 610 to affect the outcome, in this case, an act of classification of the aerial images 330.

Each of the layers in the DNN 610 can be represented as a row of such neurons 620, which act as switches that turn on or off as the input 622 is fed through the DNN 610. Each layer's output 628 is simultaneously the subsequent layer's input 622, starting from an initial input layer receiving the aerial images 330 as the input data 612, and resulting in the classification data as the final output data 616. Each layer of the DNN 610 trains on a distinct set of features based on the previous layer's output 626. The further a layer in the DNN 610 is from the input layer 612, the more complex the features the neurons 620 can recognize, because they aggregate and recombine features from the previous layers. This is known as "feature hierarchy", and it is a hierarchy of increasing complexity and aggregation of the features. It makes deep-learning networks capable of handling very large, high-dimensional data sets with billions of parameters that pass through nonlinear functions to facilitate the DNN 610 to discover latent structures within unlabeled, unstructured data.

The DNN 610 ends in the output layer 616, which is a classifier that assigns a likelihood to a particular outcome or label. The output label can be a confidence score, for example, given the input data 612 (e.g. in the form of an image), the DNN 610 can output that the input data is 90 percent likely to represent a particular defect, such as a hotspot.

Referring to the flowchart of FIG. 5, training the DNN 610 can include accessing multiple chip layouts (511) and generating aerial images 330 for each of the chip layouts (512).

In one or more examples, the aerial images 330 are generated using the aerial image generation 410. The method further includes creating training data by identifying classification labels or types of the aerial images 330 (513). In one or more examples, the aerial images 330 that are obtained by the simulation are labeled with the corresponding types of aerial image. The DNN 610 is trained using the created training data (514).

The training includes configuring weights of the neurons 620 of the various layers of the DNN 610 so that the DNN 610 can categorize the aerial images 330 according to the labels in the training data. In this case, in the training phase, the correct class for each aerial image 330 is known (this is termed "supervised training"), and the output nodes can therefore be assigned "correct" values—e.g. "1" for the node corresponding to one class, and "0" for another class. (Other values such as 0.9 and 0.1, respectively can also be used.) It is thus possible to compare the calculated values of from the DNN 610 for the neurons from the output layer 616 to these "correct" values, and calculate an error term for each neuron (the "delta"). These error terms are then used to adjust the weights in the hidden layers 614 so that, in subsequent iterations the output values are closer to the "correct" values.

In summary, the DNN 610 processes the records that include aerial images 330 and corresponding labels in the training data one at a time, using the weights and functions in the hidden layers 614, then compares the resulting outputs against the desired outputs. Errors are then propagated back through the DNN 610, causing the DNN 610 to adjust the weights for application to the next record to be processed. This process occurs over and over as the weights are continually adjusted. During the training of the DNN 610 the same set of training data is processed multiple number of times as the connection weights are continually refined.

Further yet, training the DNN 610 includes adjusting hyperparameters such as how many hidden layers 614 to include, stride size, padding size, kernel size, and the like.

Each iteration of training the DNN 610 produces a set of classification labels (515). When the output, compared to the "correct" values is within a predetermined threshold, the DNN 610 is considered to be "trained" to extract a number of feature vectors for an input aerial image 330. The number of feature vectors, dimensions of the feature vectors can depend on the architecture and hyperparameters set for the DNN 610.

In the DNN 610, the feature vector layer 618 is the hidden layer before the output layer 616. The feature vector layer 618 includes neurons 620 and the output of the feature vector layer 618 is deemed, in this case to represent feature vectors of the aerial image 330 that is input to the DNN 610.

Referring to the flowchart of FIG. 5, the trained DNN 610 is used for selecting test samples for pattern inspection coverage, at 520. The selection includes receiving the chip layout of the chip 120 that is to be tested (521). Aerial images 330 are generated using the aerial image generation 410 (522) for the chip 120. The aerial images 330 for the chip 120 are passed through the DNN 610, which is now trained (523). The method further includes extracting feature vectors from feature layer 618 for each of the aerial image 330 of the chip 120 (524). Clusters among the extracted feature vectors are determined (525) using a clustering algorithm, such as nearest neighbor, k-means, or the like.

Test samples from each of the clusters are then selected (526). For example, according to one or more embodiments of the present invention a single test sample from each of the determined cluster is selected. Accordingly, the number of test samples used for pattern inspection coverage can be reduced. In other embodiments of the present invention, a different number of test samples from each cluster can be selected, for example, two test samples from each cluster, five test samples from each cluster, and the like. Alternatively, or in addition, the number of test samples selected from each cluster is based on a number (N) of items in each cluster that is determined, for example, x % of N. The test sample can be selected stochastically from each cluster.

Figure 7:
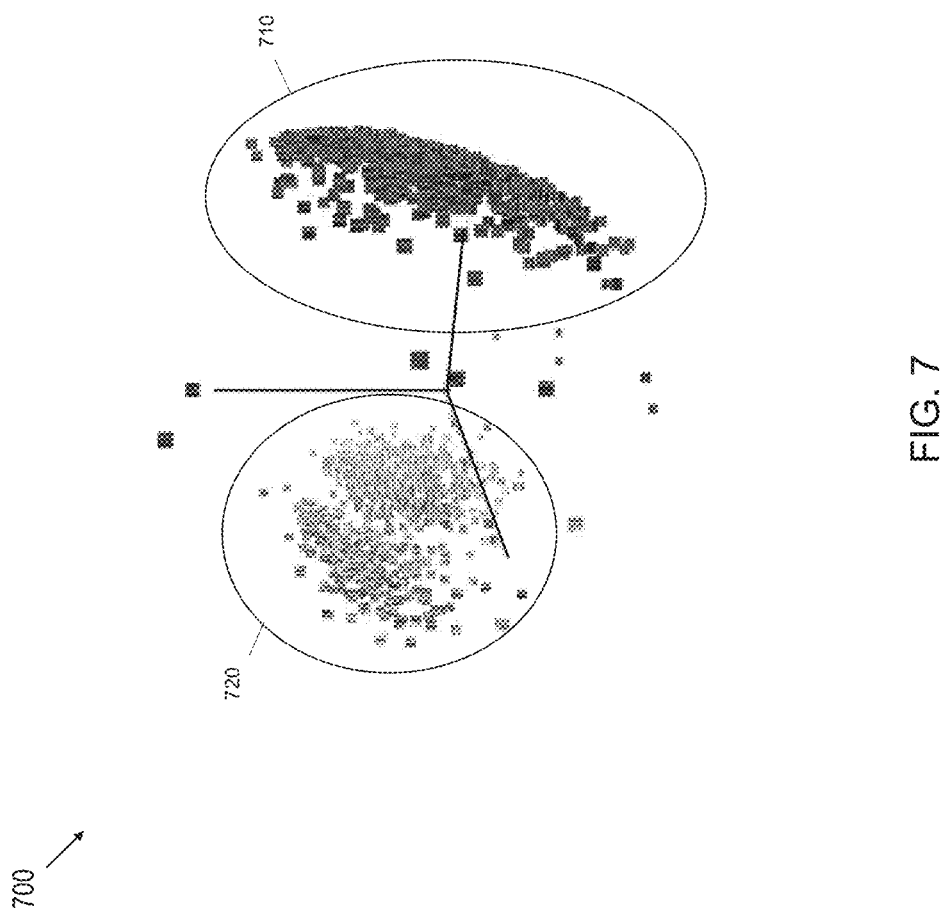
FIG. 7 depicts a visualization of the extracted feature vectors for aerial images according to an example scenario in accordance with aspects of the invention.

Further yet, test samples can be selected only from clusters that represent possibility of a defect. FIG. 7 depicts a visualization of the extracted feature vectors for aerial images 330 of the chip 120 according to an example scenario. In the depicted example, clustering the feature vectors results in at least two clusters, a first cluster 710 for regions including hotspots, and a second cluster 720 without hotspots. In this case regions from the second cluster 720 may or may not be selected for hotspot detection.

In one or more examples, a user can select to view the visualization 700 of the clusters that are determined from the extracted feature vectors from the DNN 610 (527). The visualization 700 can be a three-dimensional (3D) view of the clusters as shown in FIG. 7. It is understood that the visualization can be in any other manner, such as a 2D plot. Generating the visualization 700 can include reducing dimensions of the feature vectors that are extracted from the DNN 610. For example, the dimensions can be reduced using algorithms like principal component analysis (PCA), factor analysis, and the like.

In addition, further manipulations can be performed on the visualization 700, such as zoom-in, zoom-out, rotation, and the like to view the clusters in detail. In one or more examples, each cluster 710, 720, can be represented distinctly using one or more visualization parameter, such as color, shape, icon, and the like.

In one or more examples, selection of the test samples can be performed using the visualization 700. For example, the user can interactively select one or more feature vectors depicted in the visualization 700, and the corresponding aerial images 330 are identified. The regions corresponding to the aerial images that are selected in this manner are used as the test samples.

Accordingly, one or more embodiments of the present invention facilitate automatically extracting critical features from simulated aerial images 330 of the chip 120 using DNN 610 for test pattern sampling and pattern coverage inspection. The automatic extraction of features includes generating simulated aerial images of physical design layout of the chip 120 and determining feature vectors of the aerial images using the DNN 610 that is trained. The extracted feature vectors are categorized into one or more clusters, and samples for the pattern coverage inspection are selected from each of the determined clusters.

Figure 8:
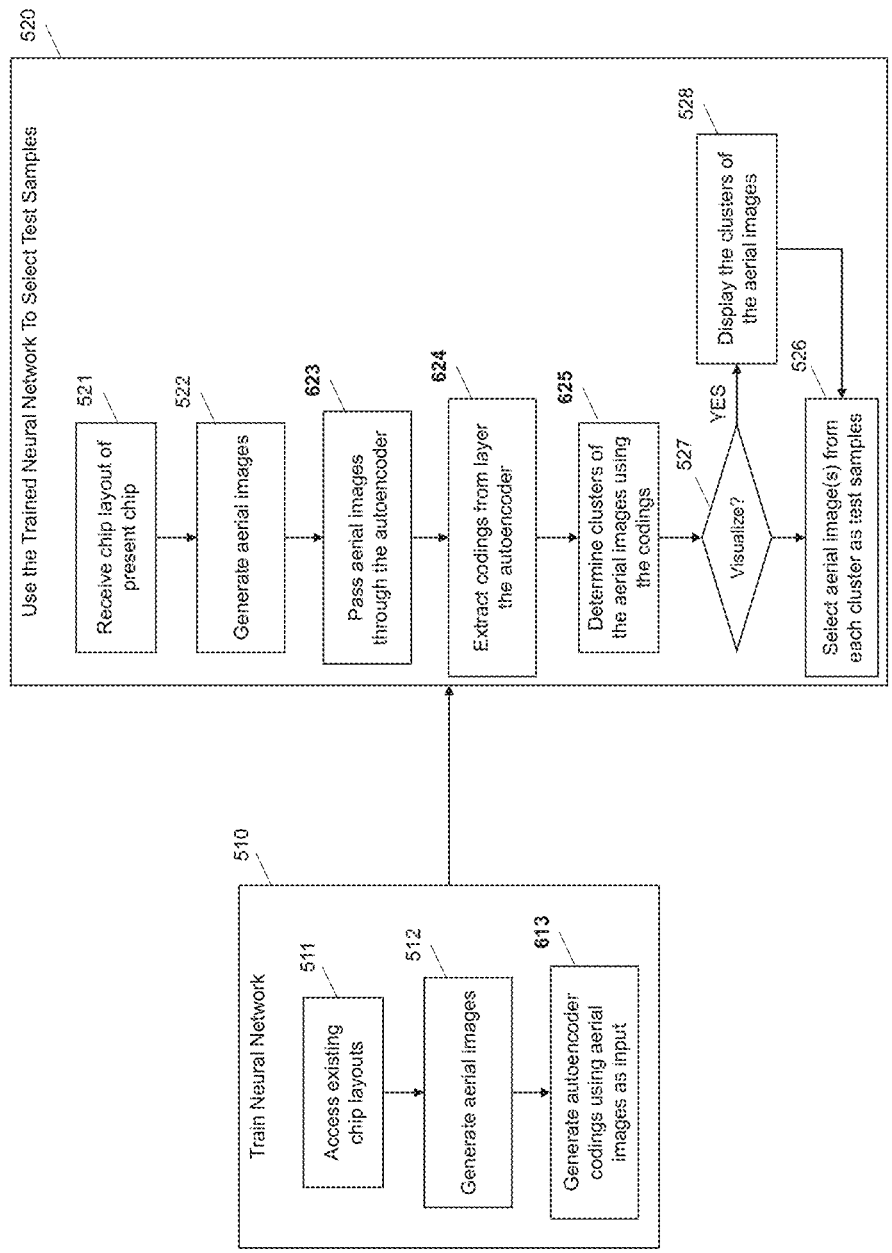
FIG. 8 illustrates a flowchart of another method of automatic feature extraction from aerial images for test pattern sampling and pattern coverage inspection according to one or more embodiments of the present invention.

FIG. 8 illustrates a flowchart of another method of automatic feature extraction from aerial images for test pattern sampling and pattern coverage inspection according to one or more embodiments of the present invention. In this case, training the neural network (510) includes using the simulated aerial images 330 of existing chip layouts (511, 512) as input for unsupervised training. The method includes generating a set of codings based on the aerial images 330 that are obtained from aerial image generation 410 using an artificial neural network in an unsupervised manner, such as using an autoencoder (613). An autoencoder learns to compress data ("encode") from the input layer into a short code, and then decompress that code ("decode") in the output layer so that the output closely matches the original input data.

Architecturally, the autoencoder can have a form similar to that of the DNN 610 depicted in FIG. 6, with an input layer 612, an output layer 616, and one or more hidden layers 614 connecting the input and output layers. However, as a person skilled in the art will recognize, the autoencoder can alternatively include convolutional layers, or other types of computation layers different from a fully connected neural network. However, in case of the autoencoder, the output layer 616 has the same number of neurons 620 as the input layer 612, and the hidden layers 614 are trained for reconstructing its own inputs, instead of iterating to find weights to match the manually identified labels in the input data. Accordingly, autoencoders generate "unsupervised" learning models, compared to "supervised" learning model in the case of the method described earlier in FIG. 5. By selecting the number of neurons 620 in each hidden layer 614, and a number of hidden layers 614, the autoencoder compresses the input data (aerial images 330) into the codings that can be subsequently decompressed to generate reconstructed images that are similar to the aerial images 330 used as input.

Referring to the flowchart of FIG. 6, the autoencoder is used to determine codings for the aerial images of the chip layout of the chip 120 that is being tested (520). Here, the aerial images 330 are simulated from the chip layout and the simulated aerial images 330 are passed through the autoencoder (623). The codings from the autoencoder are extracted (624) and used to cluster the aerial images 330 (625). The clustering can be performed using any clustering algorithm, such as k-means, nearest neighbor, and the like. The clusters are then used to select the testing samples for pattern coverage inspection (526). In one or more examples, the clusters can be visualized if the user so desires and requests (527, 528) as described herein. The visualization can be similar to that depicted in FIG. 7.

Figure 9:
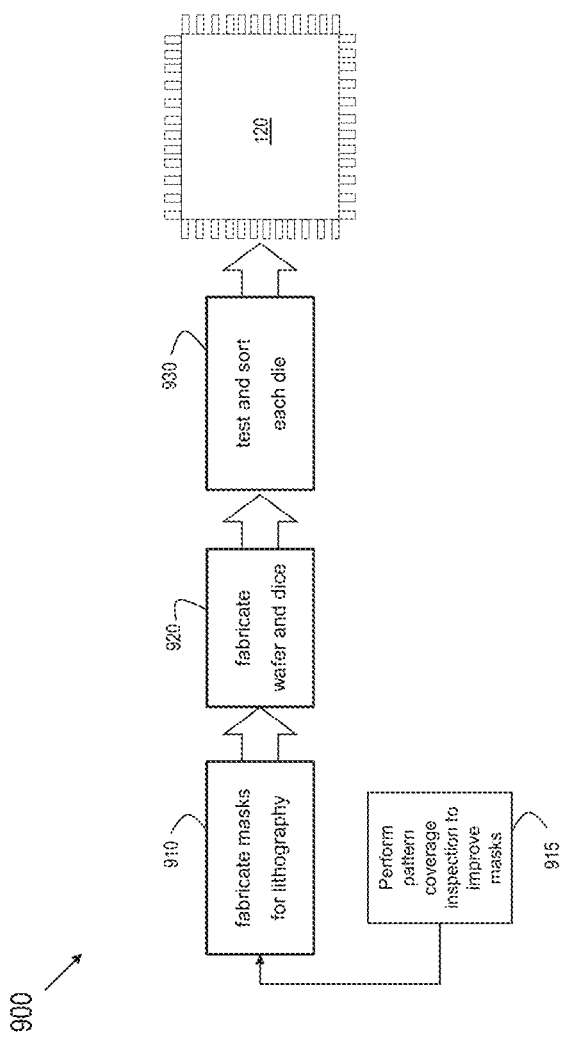
FIG. 9 is a process flow of a method of fabricating an integrated circuit according to one or more embodiments of the invention.

FIG. 9 is a process flow of a method of fabricating the integrated circuit 120 according to one or more embodiments of the invention. Once the physical design data is obtained, the chip layout is tested for potential defects using simulated aerial images according to one or more embodiments of the invention. The chip layout can be iteratively adjusted and improved to reduce the potential defects by testing selective regions from the chip layout, the testing samples used for the testing being selected as described herein. The processes 900 shown in FIG. 7 can be performed to fabricate the integrated circuit 120. Generally, a wafer with multiple copies of the final design is fabricated and cut (i.e., diced) such that each die is one copy of the integrated circuit 120. At block 910, the processes include fabricating masks for lithography based on the finalized physical layout. The masks are iteratively improved using the pattern coverage inspection described herein, at block 915. At block 920, fabricating the wafer includes using the masks to perform photolithography and etching. Once the wafer is diced, testing and sorting each die is performed, at block 930, to filter out any faulty die.

One or more embodiments of the present invention facilitate improve fabrication of a chip. Pattern coverage inspection is performed for determining whether test pattern sampling for metrology represents all the varieties of patterns fabricated on a wafer/substrate to minimize/eliminate potential defects during fabrication. Such defects can include hotspots, deviation of circuit from layout, and the like. By identifying such potential defects based on simulated aerial images, one or more embodiments of the present invention facilitate improving the chip layout early in the fabrication process so that the chip can be reworked to eliminate the defects from the end product. Accordingly, the fabrication yield is improved. Further, by detecting such defects in an automated manner, one or more embodiments of the present invention increases time efficiency of the fabrication process. For example, by using a neural network to determine test samples that are used for performing the pattern coverage inspection, to reduce the number of samples that are used for such an inspection. Further yet, the feature extraction performed for such selection of test samples uses 2D contours rather than 1D cutlines, which are typically used. Accordingly, one or more embodiments of the present invention facilitate improvement of chip fabrication, resulting in a physical implementation of the chip with an improved layout and/or with fewer defects.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for fabricating a chip, the computer-implemented method comprising:
    generating, using an aerial image generation system comprising a physical photomask template, a set of aerial images of a pattern in the physical photomask template representative of that formed on the chip, the pattern on the chip being formed according to a chip layout, the set of aerial images comprising an aerial image corresponding to each region from the chip layout;
    automatically determining, using an artificial neural network, a feature vector related to a mask image projected onto photoresist material of the chip for each aerial image from the set of aerial images of the chip, the artificial neural network being configured to process the set of aerial images having an exposure condition;
    clustering the aerial images of the chip using their corresponding feature vectors related to mask images projected onto the photoresist material of the chip, the clustering resulting in a plurality of clusters of the aerial images;
    selecting, as test samples, a subset of the aerial images of the chip from the plurality of clusters, the selecting reduces a number of the aerial images to be used for testing the chip layout formed on the chip; and
    performing a pattern coverage inspection of the chip layout formed on the chip using the aerial images that are selected as the test samples, the artificial neural network being configured for use with other aerial images for another chip layout in which the other aerial images have a same exposure condition as the exposure condition applied to the physical photomask template regardless of a size of the another chip layout.

2. The computer-implemented method of claim 1, wherein the artificial neural network comprises a deep neural network that is trained using supervised learning.

3. The computer-implemented method of claim 2, wherein the feature vector for each aerial image is automatically determined by extracting outputs of a predetermined hidden layer from the deep neural network.

4. The computer-implemented method of claim 3, wherein the predetermined hidden layer comprises a layer that immediately precedes a classification layer in the deep neural network.

5. The computer-implemented method of claim 1, wherein the artificial neural network comprises an autoencoder that is trained using unsupervised learning.

6. The computer-implemented method of claim 5, wherein the feature vector for each aerial image is automatically determined by extracting codings from the autoencoder based on each aerial image being input to the autoencoder.

7. The computer-implemented method of claim 1, wherein the artificial neural network is trained by adjusting one or more hyperparameters of the artificial neural network, the subset of the aerial images being selected from clusters of the plurality of clusters representing a possibility of a defect in the chip.

8. The computer-implemented method of claim 1, wherein the plurality of clusters of the aerial images comprises a first cluster having at least one hotspot and a second cluster excluding any hotspots, such that the first cluster displays the corresponding feature vectors of the aerial images having the at least one hotspot and the second cluster displays the corresponding feature vectors of the aerial images having no hotspot.

9. The computer-implemented method of claim 1, wherein the feature vector related to the mask image projected onto the photoresist material of the chip comprises a light intensity, a contour curvature, and a slope of aerial image intensity profiles, the light intensity being associated with a projection of the mask image onto the photoresist material, the light intensity comprising a maximum intensity and a minimum intensity.

10. A system for fabricating a chip, the system comprising:
  a memory; and
  a processor coupled with the memory, the processor configured to perform a method comprising:
    generating, using an aerial image generation system comprising a physical photomask template, a set of aerial images of a pattern in the physical photomask template representative of that formed on the chip, the pattern on the chip being formed according to a chip layout, the set of aerial images comprising an aerial image corresponding to each region from the chip layout;
    automatically determining, using an artificial neural network, a feature vector related to a mask image projected onto photoresist material of the chip for each aerial image from the set of aerial images of the chip, the artificial neural network being configured to process the set of aerial images having an exposure condition;
    clustering the aerial images of the chip using their corresponding feature vectors related to mask images projected onto the photoresist material of the chip, the clustering resulting in a plurality of clusters of the aerial images;
    selecting, as test samples, a subset of the aerial images of the chip from the plurality of clusters, the selecting reduces a number of the aerial images to be used for testing the chip layout formed on the chip; and
    performing a pattern coverage inspection of the chip layout formed on the chip using the aerial images that are selected as the test samples, the artificial neural network being configured for use with other aerial images for another chip layout in which the other aerial images have a same exposure condition as the exposure condition applied to the physical photomask template regardless of a size of the another chip layout.

11. The system of claim 10, wherein the artificial neural network comprises a deep neural network that is trained using supervised learning.

12. The system of claim 11, wherein the feature vector for each aerial image is automatically determined by extracting outputs of a predetermined hidden layer from the deep neural network.

13. The system of claim 12, wherein the predetermined hidden layer comprises a layer that immediately precedes a classification layer in the deep neural network.

14. The system of claim 10, wherein the artificial neural network comprises an autoencoder that is trained using unsupervised learning.

15. The system of claim 14, wherein the feature vector for each aerial image is automatically determined by extracting codings from the autoencoder based on each aerial image being input to the autoencoder.

16. The system of claim 10, wherein the artificial neural network is trained by adjusting one or more hyperparameters of the artificial neural network, the subset of the aerial images being selected from clusters of the plurality of clusters representing a possibility of a defect in the chip.

17. A computer program product comprising a computer readable storage medium having program instructions embodied therewith, the program instructions executable by a processing circuit to perform a method for adjusting design of a chip, the method comprising:
  generating, using an aerial image generation system comprising a physical photomask template, a set of aerial images of a pattern in the physical photomask template representative of that formed on the chip, the pattern on the chip being formed according to a chip layout, the set of aerial images comprising an aerial image corresponding to each region from the chip layout;
  automatically determining, using an artificial neural network, a feature vector related to a mask image projected onto photoresist material of the chip for each aerial image from the set of aerial images of the chip, the artificial neural network being configured to process the set of aerial images having an exposure condition;
  clustering the aerial images of the chip using their corresponding feature vectors related to mask images projected onto the photoresist material of the chip, the clustering resulting in a plurality of clusters of the aerial images;
  selecting, as test samples, a subset of the aerial images of the chip from the plurality of clusters, the selecting reduces a number of the aerial images to be used for testing the chip layout formed on the chip; and
  performing a pattern coverage inspection of the chip layout formed on the chip using the aerial images that are selected as the test samples, the artificial neural network being configured for use with other aerial images for another chip layout in which the other aerial images have a same exposure condition as the exposure condition applied to the physical photomask template regardless of a size of the another chip layout.

18. The computer program product of claim 17, wherein the artificial neural network comprises a deep neural network that is trained using supervised learning.

19. The computer program product of claim 18, wherein the feature vector for each aerial image is automatically determined by extracting outputs of a predetermined hidden layer from the deep neural network; and
   wherein the predetermined hidden layer comprises a layer that immediately precedes a classification layer in the deep neural network.

20. The computer program product of claim 17, wherein the artificial neural network comprises an autoencoder that is trained using unsupervised learning; and
   wherein the feature vector for each aerial image is automatically determined by extracting codings from the autoencoder based on each aerial image being input to the autoencoder.

* * * * *